United States Patent [19]

Chaney et al.

[11] Patent Number: 5,787,160
[45] Date of Patent: Jul. 28, 1998

[54] INTELLIGENT ROUTING OF SPECIAL SERVICE CALLS

[75] Inventors: Christine S. Chaney, Colorado Springs, Colo.; Frances D. E. Taylor, Falls Church, Va.; Cristobal A. Torres, Colorado Springs, Colo.

[73] Assignee: MCI Communications Corporation, Washington, D.C.

[21] Appl. No.: 660,735

[22] Filed: Jun. 6, 1996

Related U.S. Application Data

[63] Continuation of Ser. No. 352,319, Dec. 8, 1994, abandoned.

[51] Int. Cl.⁶ .................................................. H04M 3/42
[52] U.S. Cl. .......................... 379/220; 379/113; 379/207; 379/229; 379/265; 379/279
[58] Field of Search ...................... 379/220, 221, 379/113, 207, 219, 229, 230, 111, 112, 114, 115, 242, 243, 265, 309, 201, 133, 134, 279

[56] References Cited

U.S. PATENT DOCUMENTS

| | | |
|---|---|---|
| 4,400,587 | 8/1983 | Taylor et al. . |
| 4,737,983 | 4/1988 | Frauenthal .......................... 379/221 |
| 4,951,310 | 8/1990 | Honda et al. . |
| 5,101,451 | 3/1992 | Ash et al. . |
| 5,164,983 | 11/1992 | Brown et al. ...................... 379/207 |
| 5,168,515 | 12/1992 | Gechter et al. . |
| 5,212,727 | 5/1993 | Ramkumar ......................... 379/221 |
| 5,226,075 | 7/1993 | Funk et al. . |
| 5,271,058 | 12/1993 | Andrews et al. . |
| 5,289,371 | 2/1994 | Abel ................................... 379/134 |
| 5,291,550 | 3/1994 | Levy et al. . |
| 5,291,552 | 3/1994 | Kerrigan et al. . |
| 5,299,259 | 3/1994 | Otto ................................... 379/266 |
| 5,311,584 | 5/1994 | Bogart et al. . |
| 5,329,583 | 7/1994 | Jurgensen et al. . |
| 5,335,268 | 8/1994 | Kelly ................................. 379/221 |
| 5,530,744 | 6/1996 | Charalambous .................. 379/207 |
| 5,537,611 | 7/1996 | Rajagopal ........................ 379/207 |

*Primary Examiner*—Krista Zele
*Assistant Examiner*—Scott Wolinsky

[57] ABSTRACT

The termination availability database (TADB) of the instant invention performs routing decisions in response to call requests received from data access points (DAPs). The TADB takes each of the requests, which relate to a special service call of a subscriber, and determines the particular termination of the subscriber to which the call is to be routed. To perform its determination of where to route the calls, the TADB takes into consideration data collected from the network and the availability of the different terminations of the subscriber. In addition, allocation algorithms are used.

18 Claims, 8 Drawing Sheets

| 0: 1 | 1: 51 | 2: 11 | 3: 61 | 4: 21 | 5: 71 | 6: 31 | 7: 81 | 8: 41 | 9: 91 |
|---|---|---|---|---|---|---|---|---|---|
| 10: 6 | 11: 56 | 12: 16 | 13: 66 | 14: 26 | 15: 76 | 16: 36 | 17: 86 | 18: 46 | 19: 96 |
| 20: 2 | 21: 52 | 22: 12 | 23: 62 | 14: 22 | 25: 72 | 26: 32 | 27: 82 | 28: 42 | 29: 92 |
| 30: 7 | 31: 57 | 32: 17 | 33: 67 | 34: 27 | 35: 77 | 36: 37 | 37: 87 | 38: 47 | 39: 97 |
| 40: 3 | 41: 53 | 42: 13 | 43: 63 | 44: 23 | 45: 73 | 46: 33 | 47: 83 | 48: 43 | 49: 93 |
| 50: 8 | 51: 58 | 52: 18 | 53: 68 | 54: 28 | 55: 78 | 56: 38 | 57: 88 | 58: 48 | 59: 98 |
| 60: 4 | 61: 54 | 62: 14 | 63: 64 | 64: 24 | 65: 74 | 66: 34 | 67: 84 | 68: 44 | 69: 94 |
| 70: 9 | 71: 59 | 72: 19 | 73: 69 | 74: 29 | 75: 79 | 76: 39 | 77: 89 | 78: 49 | 79: 99 |
| 80: 5 | 81: 55 | 82: 15 | 83: 65 | 84: 25 | 85: 75 | 86: 35 | 87: 85 | 88: 45 | 89: 95 |
| 90: 10 | 91: 60 | 92: 20 | 93: 70 | 94: 30 | 95: 80 | 96: 40 | 97: 90 | 98: 50 | 99: 100 |

FIG. 8

| 8001-ORG1: | LT1 50%<br>(1-50) | LT2 50%<br>(51-100) | | |
|---|---|---|---|---|
| 4 Calls: | 1 | – | | |
| | – | 51 | | |
| | 11 | – | | |
| | – | 61 | | |
| Allocation of Calls: | 2 | 2 | | |

| 8001-ORG2: | LT1 40%<br>(1-40) | LT2 30%<br>(41-70) | LT3 20%<br>(71-90) | LT4 10%<br>(91-100) |
|---|---|---|---|---|
| 10 Calls: | 1 | – | – | – |
| | – | 51 | – | – |
| | 11 | – | – | – |
| | – | 61 | – | – |
| | 21 | – | – | – |
| | – | – | 71 | – |
| | 31 | – | – | – |
| | – | – | 81 | – |
| | – | 41 | – | – |
| | – | – | – | 91 |
| Allocation of Calls: | 4 | 3 | 2 | 1 |

FIG. 9

INTELLIGENT ROUTING OF SPECIAL SERVICE CALLS

This application is a continuation of U.S. patent application Ser. No. 08/352,319, filed Dec. 8, 1994, now abandoned.

FIELD OF THE INVENTION

The present invention relates to a system and methods therefor for controlling the routing of special service telephone calls, such as 800 or 900 calls, through a telecommunications network, and more particularly relates to the routing and balancing of the traffic directed to the various terminations of the network based on the capacity availability of the respective terminations on a call by call basis.

BACKGROUND OF THE INVENTION

In a telecommunications network as presently used, when customers (subscribers) subscribe to a special service call number, such as 800 or 900, they usually would provide a number of help desks or stations staffed by multiple operators (or agents) around the country to answer the many callers of the special service call number. When someone calls the special service call number, for example an 800 number, a translation is made in a database to convert the dialed 800 number into a specific phone number in order to route the call to one of the various locations staffed by agents of the subscriber. Once the call is routed to a particular site, the call is handled by the agents at that location.

Ordinarily, the subscriber to the special call service has a number of locations to which calls are routed. The locations are typically equipped with customer premise equipment (CPE), known as automatic call distributors (ACDs). Each of the ACDs is staffed by multiple agents. Depending on the time of day, the location where the calls originate and other considerations, calls made to a particular 800 number may be routed to different ACDs. The respective sites of the subscriber are oftentimes assigned different rates, or percentages, for receiving the calls so that different amounts of calls are routed to the different ACDs. For example, given three sites to which calls may be directed, a fixed table in a database would assign different percentages to those sites—for example 20% to the first ACD, 30% to the second ACD and 50% to the last ACD. Having been assigned the respective percentages, the amount of calls to be directed to the different ACDs would remain constant relative to each other, irrespective of the capacity at each of the sites.

Also included in the fixed table are parameters such as the time of day, when the site begins business, the close of business, lunch times, etc. that allow a subscriber to change the amount of calls to be directed to the different sites at given times. Yet this allocation of where the calls are to be routed oftentimes does not match the actual circumstances at the respective sites. For example, overflows or shortage of staff do occur at the sites. Accordingly, optimal routing of calls is often not effected. In other words, there is an unbalancing of workload for the different agents at the different sites. This is particularly true when there is a sudden spike or peak in terms of the amount of traffic across the network. An example of this type of abnormal happening occurred during a political campaign in which the network was suddenly flooded with 800 calls originating from a given location. And these calls, according to the routing plan in the table set up in the database, were all to be directed to the closest ACD whose capacity was quickly overwhelmed.

Figure 1:
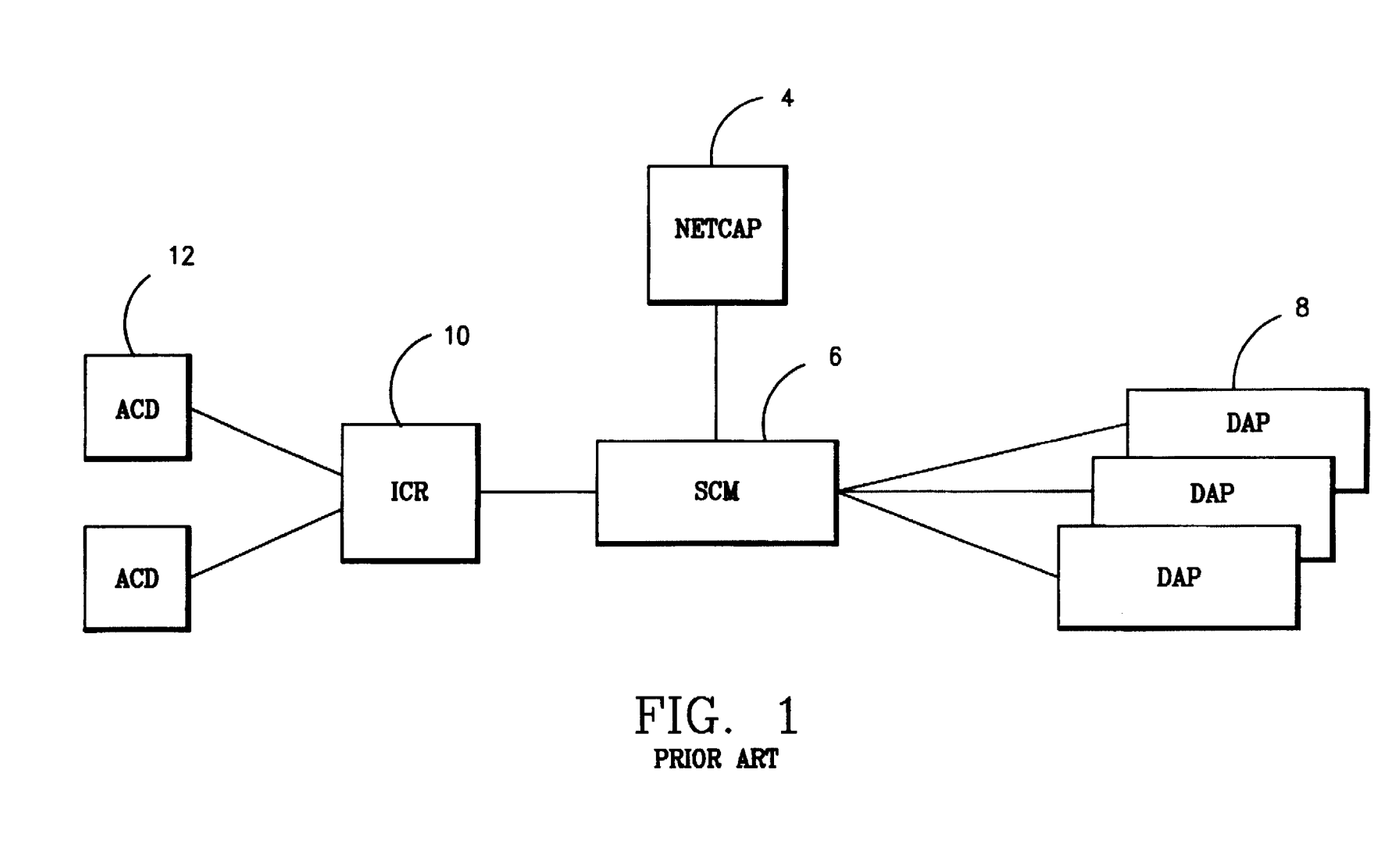
FIG. 1 is a simplified diagram illustrating a prior art call routing system.

An example of a prior art system is shown in FIG. 1. There routing plans of a special service call of a subscriber, for example a 800 number, are input to a network capabilities database system (NetCap) 4. Multiple routing plans are often input for each 800 number. For example, one of the routing plans may be for Monday, one for Tuesday, one for Wednesday, one for emergencies, one to exclude a specific termination and so forth. Only one of these routing plans is activated at any one time.

A service control manager (SCM) 6 is shown to be connected to NetCap 4. SCM 6, in actuality, is downloaded from NetCap 4 with the currently active routing plan, and is basically a system in charge of distributing the active routing plan into all of the connected thereto data access points (DAPs) 8. Thus, when a call comes into a DAP based on the 800 number, DAP 8 is able to determine that, with regard to this 800 number, 40% of the calls are to be routed to a first location and 60% of the calls are to be routed to a second location, for example. In essence, therefore, DAP 8 effectively translates the 800 number into a real switch termination.

Further shown in FIG. 1 is an intelligent call routing (ICR) system 10 described in U.S. Pat. No. 5,335,268. The disclosure of the '268 patent is incorporated by reference herein. In brief, ICR 10 is connected to a plurality of automatic call distributors (ACDs) 12 of the subscriber. From ACDs 12 the ICR 10 is able to retrieve information such as the number of calls and agents at the ACDs 12 so that it can intelligently interface with SCM 6, and to therefore update the active routing plan which the DAPs 8 use to route calls for the 800 number. For example, instead of the earlier discussed 40/60% allocation, ICR 10 may inform DAP 8 via SCM 6 that for the next interval of time, for example the next 5 minutes, the allocation of calls to the two terminations would be 50/50. With such scheme, however, there is no real measure of the volume of calls that is coming in at the time the routing decisions are made. In other words, there is a projection based on the network data of calls that are being collected, but there is no consideration of the individual incoming calls. Although near real time and effective, the load balancing method of the '268 patent nonetheless is not real time.

Accordingly, it is an objective of the present invention to provide a more dynamic, real time system and method for routing and balancing traffic of special service calls through a telecommunications network.

It is yet another objective of the present invention to provide a system and method for routing and balancing the special service calls through a telecommunications network on a call by call basis.

It is moreover another objective of the present invention to provide a system and method of routing and balancing calls of a special service call number based on the instantaneous availability of the different terminations to which calls to the special service call number are routed.

SUMMARY OF THE INVENTION

The system of the present invention, in making a decision on where to route a call of a special service call such as a 800 number call, takes into consideration the updated information about the availability at each of the designated sites on a call by call basis so that it can decide which one of the subscriber's terminations is most available (or most appropriate) to take the call. In other words, on a real time basis, the availability (or appropriateness) status of each of the terminations of the subscriber is reviewed and, despite whatever the routing plan of the subscriber demands, a determination is made by the system of the instant invention on whether to override the route plan so as to send a call to the most available/appropriate termination.

This call by call determination is achieved by following the routing plan of the subscriber, which may be in the form of a decision tree. Planted at various stages of the decision tree are trigger points which inform the system to use a particular algorithm residing in the memory of the system to determine the termination from among the identified terminations of the subscriber to which the call is to be routed. One of the algorithms that may be used by the system of the present invention is a precise percent allocation (PPA) algorithm. Another algorithm is a sequential allocation routing (SAR) method which also may be referred to as uniform call distribution (UCD).

Thus, when a trigger point is encountered in the decision tree of the routing plan of the subscriber during call processing, the DAP will interrogate the system of the present invention for a recommended termination. Using the information of the terminations stored in the database at its disposal and based on the calculation of the algorithm invoked in response to the trigger point, the present invention system will respond to the DAP with the appropriate termination. This is done on a call by call basis to ensure that the responses are realistic and based on the most up-to-date information according to the selected algorithm.

The system of the present invention comprises a processor having its own database connected to each of the DAPs. For the discussion of the instant invention in this application, this system may be referred to as the termination availability database (TADB). Additional algorithms which may utilize the availability feeds of the TADB are planned for the future.

The PPA algorithm uses an array having a plurality of elements or numbers arranged to optimize the precision of the allocation of calls to terminations. An index acts as a pointer to the array, and specifically points to a given number along the array. As calls are received by the DAP, the index for that 800 number is incrementally moved along the array, one element for each call. The number on the array to which the index points provides the information for the TADB to instruct the DAP to route the call to the appropriate termination. Thus, each incoming call is represented by a number on the array which in turn indicates a particular termination of the subscriber to which that call is to be routed, on a call by call basis. When the index reaches the end of the array, it returns to the beginning of the array upon receipt of the next incoming call. The process again is repeated for further incoming calls.

The SAR algorithm associates an index to the terminations identified in the routing plan of a subscriber. This index is incremented as each call of the 800 number of the subscriber comes in. Thus, for each of the subsequent incoming calls, the index is incremented so that calls are uniformly routed to the different terminations.

BRIEF DESCRIPTION OF THE DRAWINGS

The above mentioned objectives and advantages of the present invention will become more apparent and the invention itself will be best understood by reference to the following description of the present invention taken in conjunction with the accompanying drawings, wherein.

DETAILED DESCRIPTION OF THE PRESENT INVENTION

Figures 2, 3:
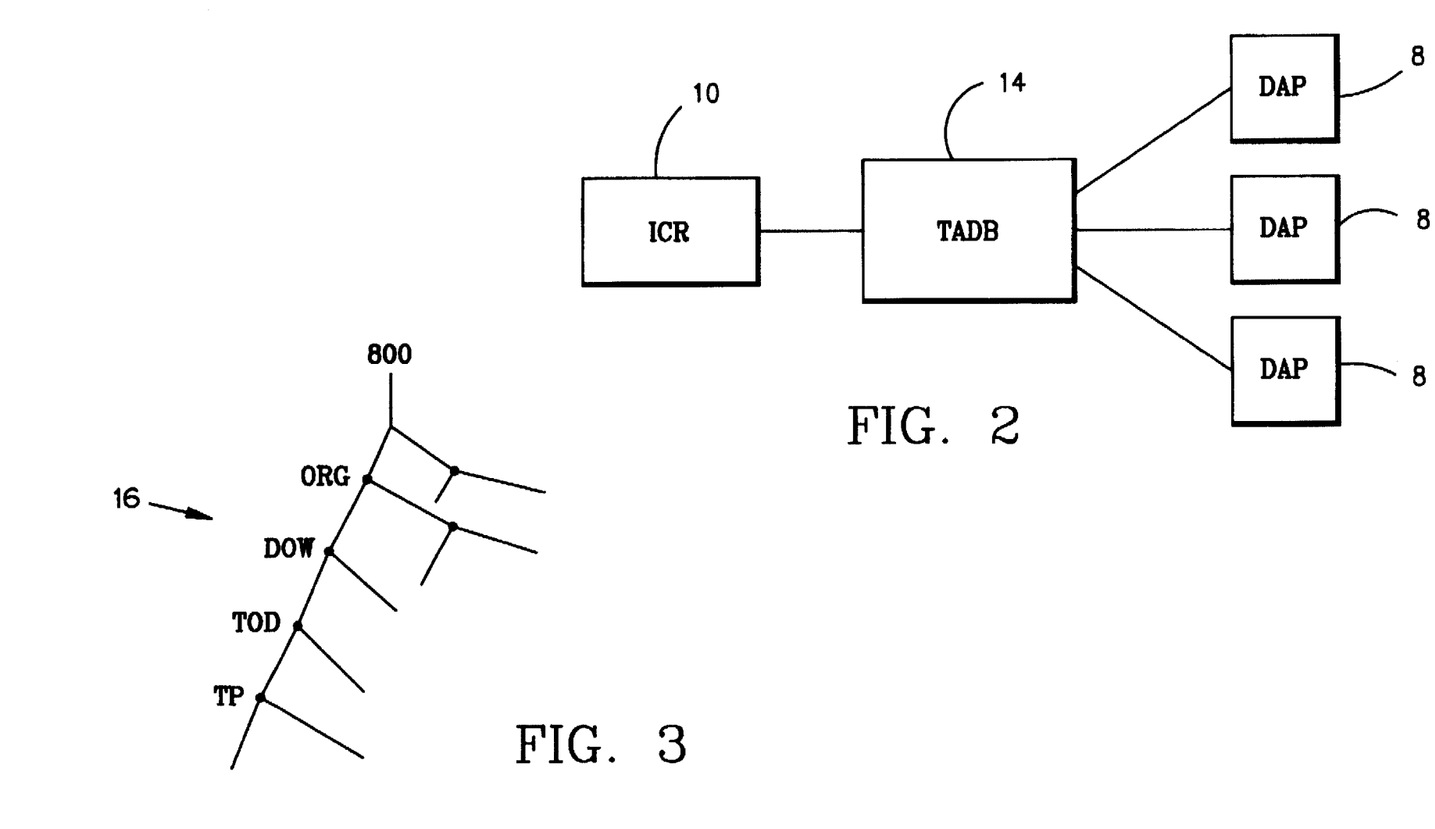
FIG. 2 is a simplified block diagram illustrating the TADB of the present invention, as it is connected to other components of the network.
FIG. 3 is an exemplar routing plan of a subscriber of a special service call.

With reference to FIG. 2, the present invention system termination availability database (TADB) 14 is shown to be connected to a plurality of DAPs 8 and an intelligent call routing system (ICR) 10. An ICR command intelligent common language interface (ICLI) provides interfacing between ICR 10 and TADB 14. Customer premise equipment (CPE) and network data collected by ICR 10 are used to provide an availability feed to TADB 14. In addition, by means of the interconnection therebetween, TADB 14 communicates with DAPs 8 which, in receipt of the routing plans from the subscribers, would allocate special service calls received to different terminations in accordance with the subscriber's routing plans.

To provide more effective routing of the incoming calls, each of the routing plans includes a decision tree, such as 16 shown in FIG. 3. As shown, the decision tree is identified by its 800 special service call number. Focusing only on the left branch of the tree, it should be noted that the origination of the call is identified at a node designated ORG. The day of the week is identified at the node designated DOW. The time of day is identified as TOD at a lower node. At a branch node thereunder, there is a trigger point (TP) or trigger ID. When TP is encountered during call processing, DAP 8 will interrogate TADB 14 for a recommended termination.

Based on the algorithm used which is selected by the trigger point, and the availability of the different terminations calculated from a variety of data from ICR 10 including CPE and network statistics, TADB 14 calculates from among the different identified terminations of the subscriber the most appropriate termination for the DAP to route an incoming call.

Further with reference to FIG. 3, it should be noted that a plurality of trigger points may be set up at any of the various nodes of the tree of the routing plan of the subscriber. Each of the trigger points is an indication to the DAP that it must branch out of its normal (default) call processing and interrogate an external system for additional routing information. In the case where DAP 8 is to interrogate TADB 14, TADB 14, upon receipt of the request from the DAPs, will use the trigger point to determine the method of routing, in conjunction with other information in its databases. It should be noted, however, that the interconnections between TADB 14, DAPs 8 and ICR 10 are as shown in FIG. 2 only for the sake of clarity.

Figure 4:
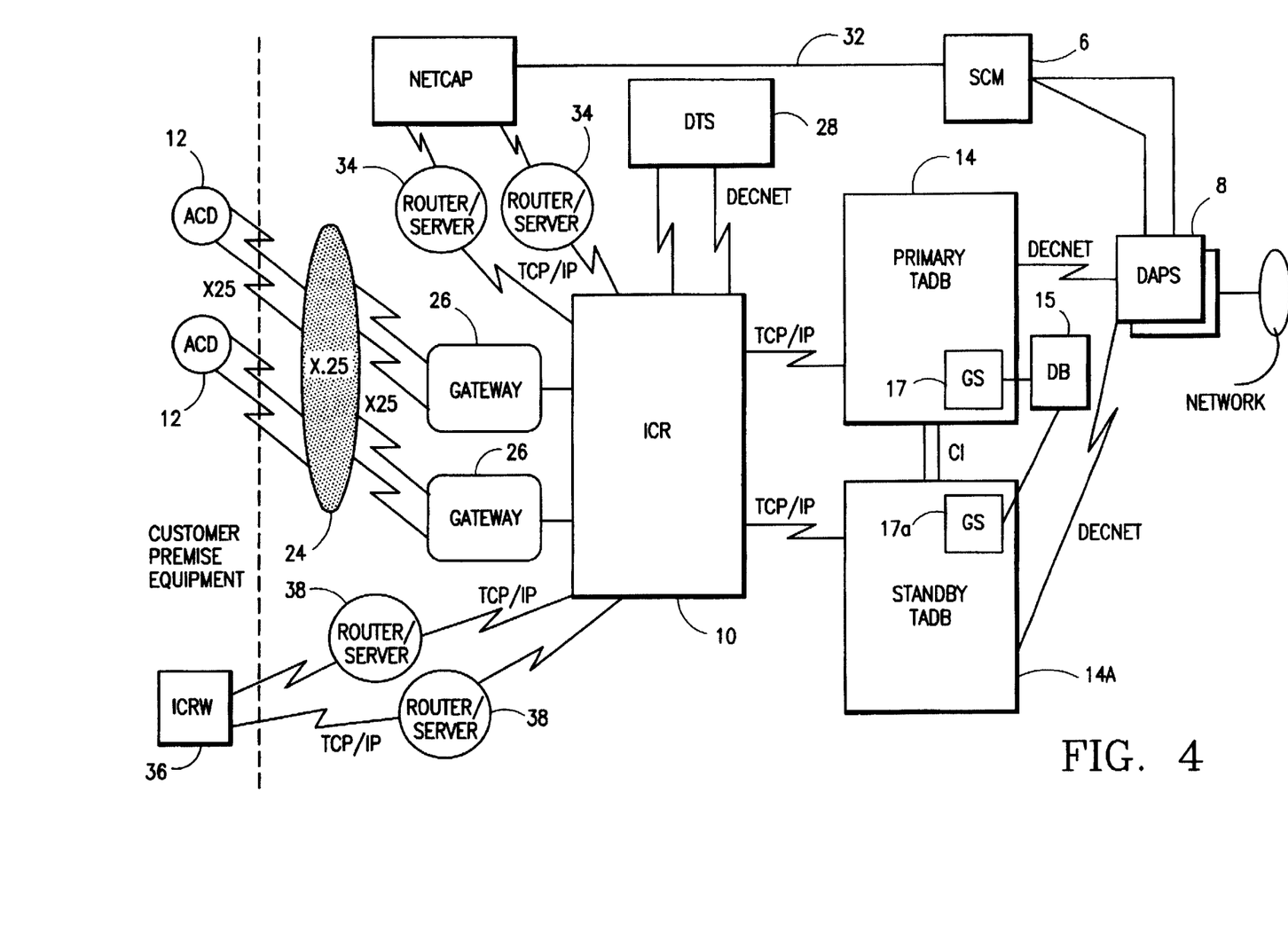
FIG. 4 is a diagram illustrating the different hardware components of the system of the instant invention and its connection to the various hardware components of an intelligent telecommunications network.

FIG. 4 provides a more detailed illustration of the hardware components of the present invention system. As shown, TADB 14 of FIG. 2, in actuality, comprises a primary TADB 14 and a standby TADB 14a. These TADBs are in fact made up of computer systems such as for example the DEC VAX 7610 system. As shown, of the two clustered processors, only TADB 14 is active while TADB 14a is on hot standby. Thus, if TADB 14 fails, TADB 14a will pick up the processing. As further shown, TADB 14 is connected to TADB 14a by a connection line, identified as CL. Thus, both TADB 14 and TADB 14a contain the same information.

Further shown to be connected to each of TADBs 14 and 14a is a database 15 for storing, among other things, current availabilities information, in their respective global sections 17 and 17a. A global section is an area of the memory in TADB 14 (and TADB 14a) that is mapped to the disk memory of the database. This mapping allows the TADBs to have a synchronized image of the disk file in the memory of database 15 so that if ever there is a failover in the primary TADB 14, the standby TADB 14a would promptly take over operation by accessing the disk and bring its standby memory up-to-date, i.e., set its computer memory to the active mode.

Figure 5:
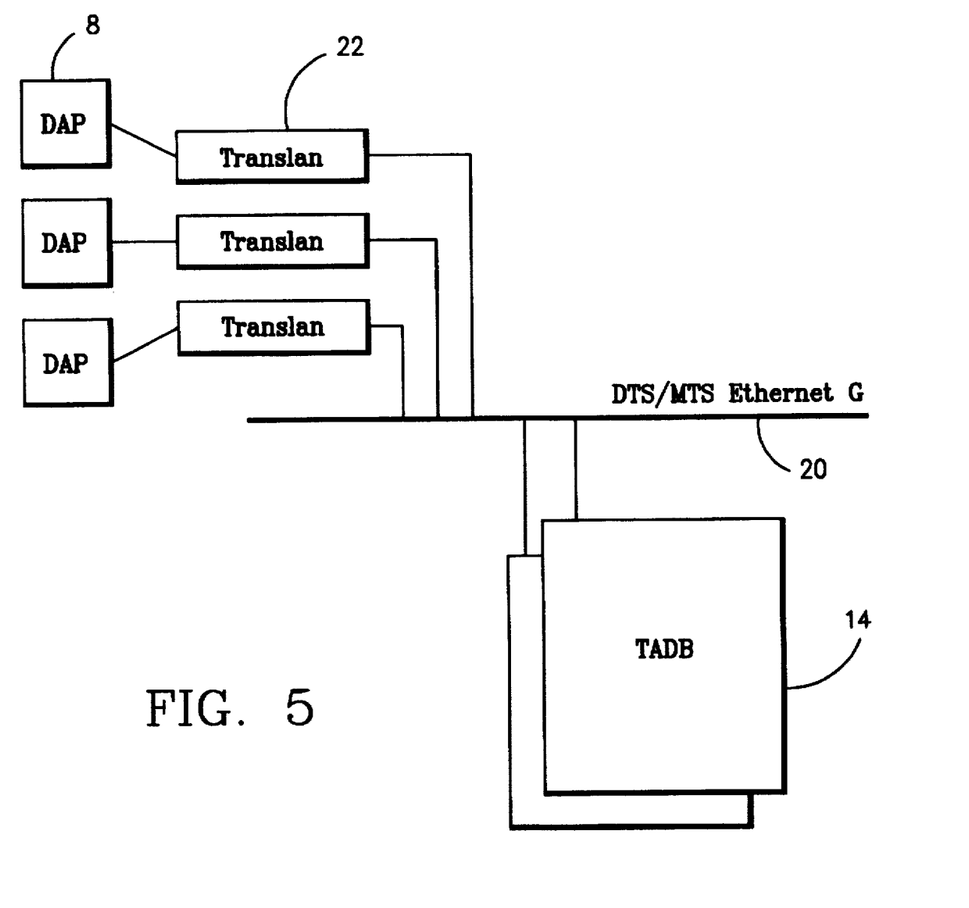
FIG. 5 is a diagram illustrating the connection of the TADB of the instant invention to the network.

TADBs 14 and 14a are shown to be connected to DAPs 8 by means of a DECNET network. As more clearly shown in FIG. 5, TADBs 14 and 14a are connected to an ethernet rail identified as DTS/MTS ethernet G 20. Also connected to ethernet 20 are a plurality of translan bridges 22 to which the different DAPS 8 are connected.

Return to FIG. 4. As further shown, TADBs 14 and 14a are connected to ICR 10 by respective transmission control protocols/internet protocols (TCP/IP) connections. As is well known, the TCP/IP connections are in essence computer interfacing connections for providing communication between TADBs 14 and ICR 10.

ICR 10 includes an intelligent routing host (IR host) that interfaces with a plurality of automatic call distributors (ACDs) 12 via an X.25 network. As shown, connecting the ACDs 12 and ICR 10 is an X.25 network 24 and a number of gateways 26 for providing wide area network (WAN) to local area network (LAN) interfacing between ICR 10 and ACDs 12. The ACDs provide feedback in the form of agent availability and call handling times.

Also shown to be connected to ICR 10 is a DAP traffic statistics (DTS) system 28 for collecting network traffic statistic and routing the data to ICR 10 through a DECNET network. In brief, DTS 28 gets statistics data, relating to the dispositions of calls in the network from DAPs 8 in predetermined time intervals, for example 5 minute intervals. This information includes data point statistics which, in essence, informs the system for each 800 number when the trigger points are used, where the calls are routed, and whether the calls are actually terminated from the perspective of the network. DTS 28 in essence provides a feedback from the network.

Further shown to be connected to ICR 10 is a network capability (NetCap) system 30. It is at NetCap 30 that routing plans from the subscribers are input, and where information relating to the trigger points and the percentage allocations and the priorities of the terminations are downloaded into SCM6, which distributes them to the DAPs 8 via connection 32. By means of the TCP/IP connection and the router/server 34 in the TCP/IP network, information relating to the terminations being referenced by the routing plans are also provided to ICR 10. This enables ICR 10 to send updated information to TADB 14.

Further shown to be connected to ICR 10 is an intelligent call routing work station (ICRW) 36. ICRW 36 is connected to ICR 10 by means of TCP/IP networks, and router/servers 38 connected thereto. ICRW 36 is a work station which may be located at the subscriber's premises to provide the subscriber the ability to enter management and configuration information.

Figure 6:
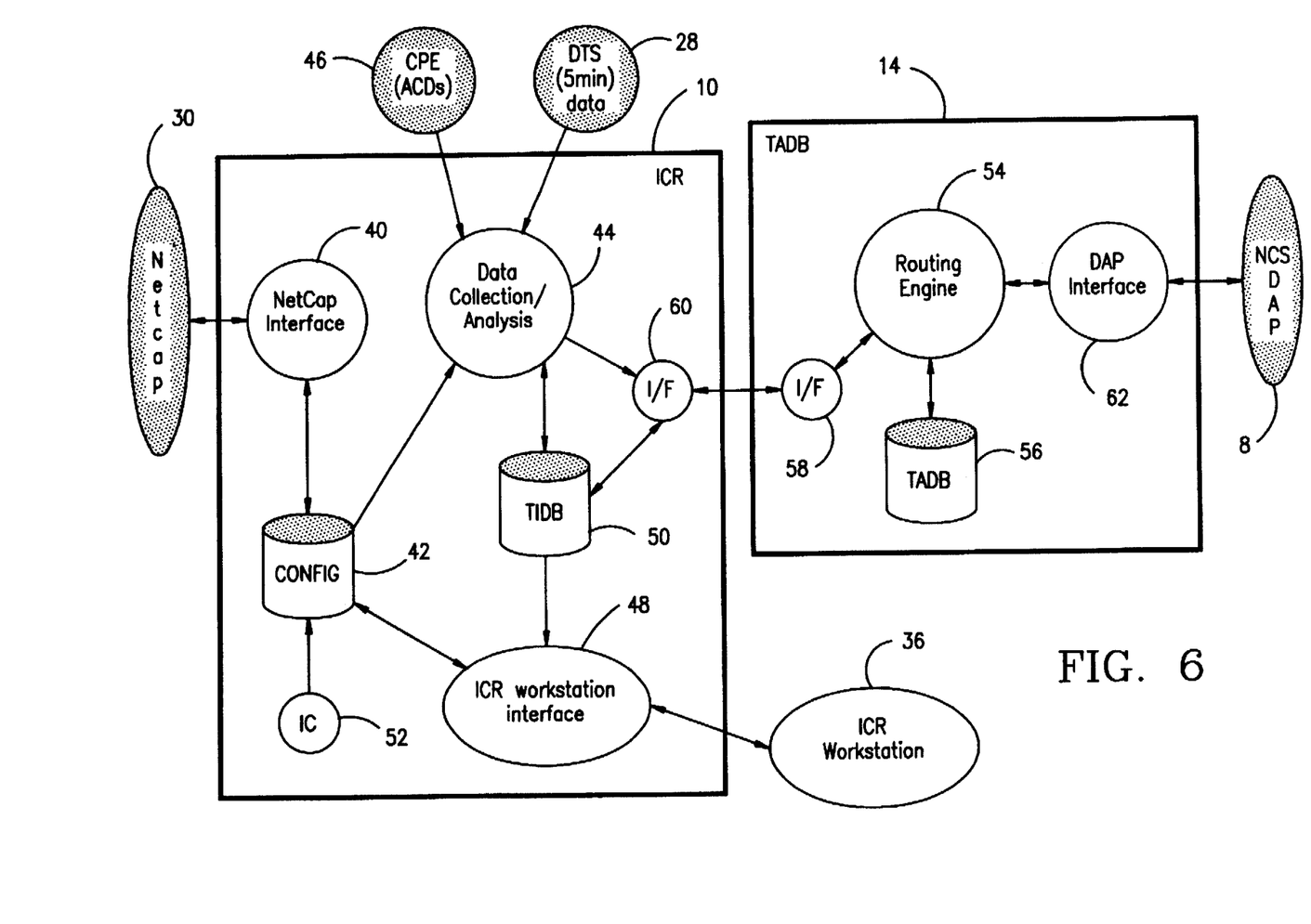
FIG. 6 is a diagram illustrating the interrelation between the intelligent call routing element (ICR) of the network and the TADB of the instant invention.

The interaction between TADB 14 and ICR 10 is further illustrated in FIG. 6. As shown, configuration data is exchanged between NetCap 30 and the CONFIG database 42. Data from CONFIG database 42 is retrieved by the data collection/analysis process 44, which may be an application residing in the processor of ICR 10. In addition to ICRW 36, data from the CPE at the subscribers' premises, for example the ACDs, are provided to processor 44. Also provided to processor 44 is the traffic statistics data, provided for this embodiment in 5 minute intervals, from DTS 28. With respect to ICRW 36, it should be noted that an ICRW interface 48 is provided between ICRW 36 and the CONFIG database 42. In addition, information from data collection/analysis processor 44 is fed to a traffic information database (TIDB) 50. An ICRW interface 48 retrieves information from TIDB 50 and forwards it to ICRW 36. Control of CONFIG database 42 is provided by internal controller (IC) 52.

TADB 14 is connected to ICR 10 via a TCP/IP network connection. As shown in FIG. 6, the process of TADB 14 contains a routing engine process 54, which is further described with reference to FIG. 7. Connected to routing engine 54 is a memory medium, for example a magnetic or electronic memory 56, used as the database of TADB 14. Processor 54 is connected to an interface (I/F) 58 for communicating with a similar interface 60 residing in ICR 10. Further shown to be connected to processor 54 is a DAP interface 62 which allows TADB 14 to communicate with the DAPs which communicate in turn with the switch at which the call originated.

Figure 7:
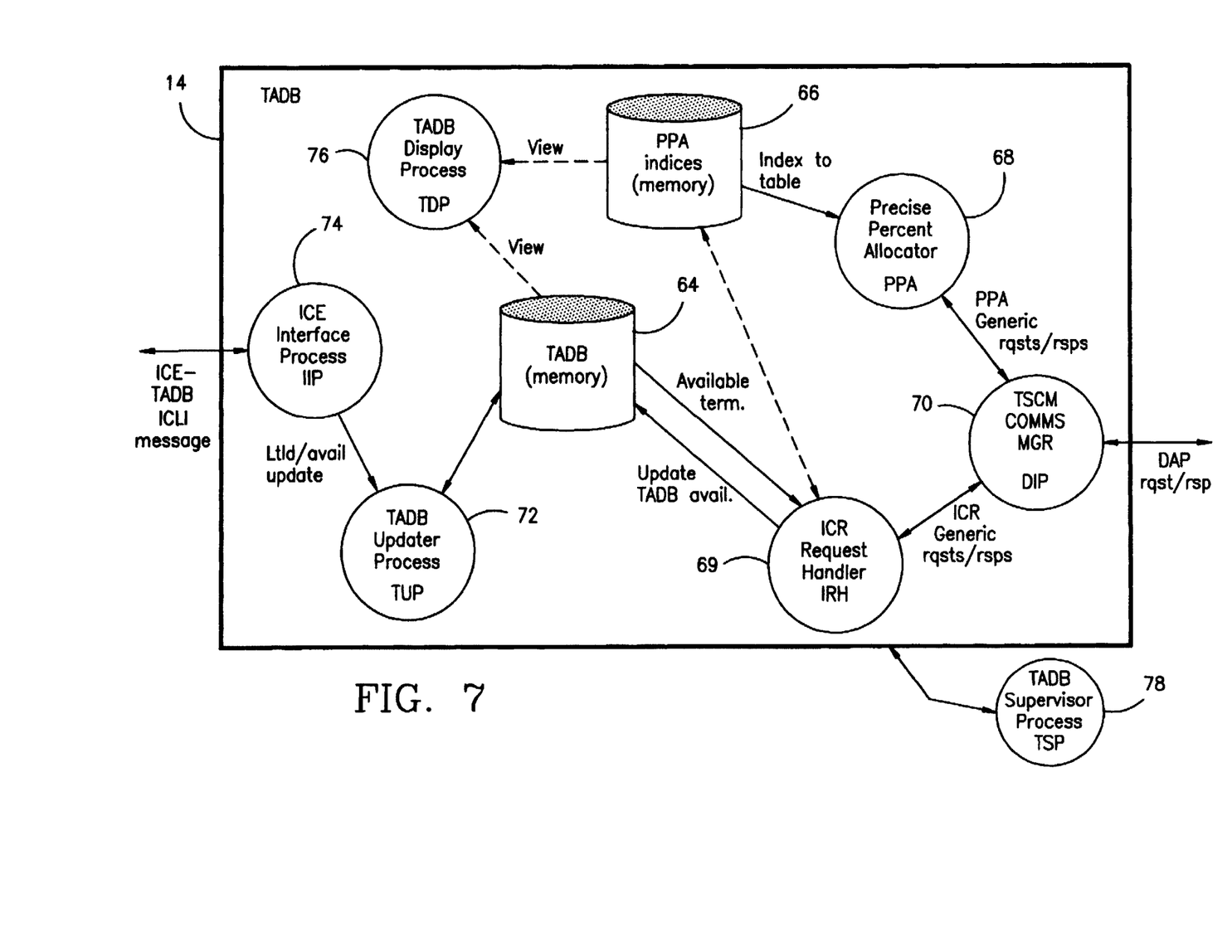
FIG. 7 is a process and data flow diagram illustrating the internal workings of the TADB of the instant invention.

As further illustrated in the more detailed process and data flow diagram of FIG. 7, there are a number of processes being effected in TADB 14. As shown, there are two parts to the TADB database 56, namely a TADB memory 64 and a precise percent allocation (PPA) indices memory 66. The PPA memory 66 contains indices for the PPA and SAR algorithms, to be discussed later; while the TADB memory 64 contains information relating to the termination sets that are used for load balancing algorithms, namely the pure load balancing (PLB) algorithm and percent allocation with load balancing above threshold (PALB) algorithm. The PPA and SAR algorithms are represented by the PPA process designated 68 while the PLB and PALB algorithms are represented by the ICR request handler (IRH) process 69. Do note that the PLB and PALB algorithms will be discussed in detail in a co-pending application Ser. No. 08/739,993 filed on Oct. 30, 1996 entitled "Intelligent Load Balancing of Special Service Calls Based on Availability of Terminations" and assigned to the same assignee as the instant application.

Interacting with the PPA and IRH routing processes 68 and 69, respectively, is a transaction server communication manager (TSCM) 70 which interacts with DAPs 8. TSCM 70 is a standard network control system (NCS) transaction server communication manager application which handles the communications between the DAPs and two TADB request handler processes, namely IRH (ICR request handler) and PPA, which perform the routing decisions in response to requests from the DAP. Information needed to perform routing is stored in the PPA memory 66 and also the termination availability (TA) databases that are stored in TADB memory 64. The request handlers access and update the databases, according to the type of routing being performed. The databases are also updated in response to messages from external systems, such as that from ICR 10, which provide feedback from the network (via DTS 28) and customer premise equipment (CPE) 46.

Given that a detailed description of the PPA algorithm has not been given, it is sufficient for now to note that the PPA process is concerned with call routing based on a termination array's percent allocations (PPA) or a termination array's sequential order (SAR). Hence, access to the TA database is not required for these routing algorithms. The PPA process adds information to the PPA database as calls from new subscribers are received. The IRH process involving the PLB and PALB algorithms will be described in detail in the aforenoted co-pending application.

A TADB supervisor process (TSP) 78 is responsible for starting the processes, and restarting them if they terminate unexpectedly. For redundancy, the TADB system is maintained on two processing nodes, and the supervisor controls which of the two is the active node and handles failover between them. The supervisor communicates with individual processes via a set of commands which relate to process activity states and configuration information. This enables changes to be made while processes are running.

As further shown in FIG. 7, connected to TADB memory 64 is a TADB updater process (TUP) 72. Connected to TUP 72 is an ICE interface process (IIP) 74 which interacts with ICR 10 and provides the available updated information to TADB via TUP 72. A TADB display process (TDP) 76 is also performed by the processor of TADB for viewing the PPA memory 66 and TADB memory 64.

As routing requests are received from the DAP, TSCM 70 would first validate the message and then pass the request to PPA 68 or IRH 69, according to the type of routing that has been requested. A response is formatted and returned to the originating DAP, and another request is read.

The routing request from the DAPs are constructed according to the information contained in the routing plan stored therein, and are formatted as generic request messages containing a fixed message header, followed by a number of optional components. Two of the optional components, namely database keys and call allocation array, are used in the TADB call routing.

The routing request has a header which contains a trigger ID field for specifying the particular algorithm that is to be used to process the routing request. This is used to determine which process is to handle the request.

The second optional component of the DAP routing request that is used by TADB 14 is the database keys component which provides information about the routing plan at which the trigger point was encountered. The customer and the originating area ID are used by TADB 14 to identify a particular index to be used in making the routing decision in the PPA database. (More on the index later in the discussion of the PPA algorithm.) If a call request is received which has a previously unencountered customer key and an originating area ID combination, a new PPA database entry is created and initialized.

Figure 8:
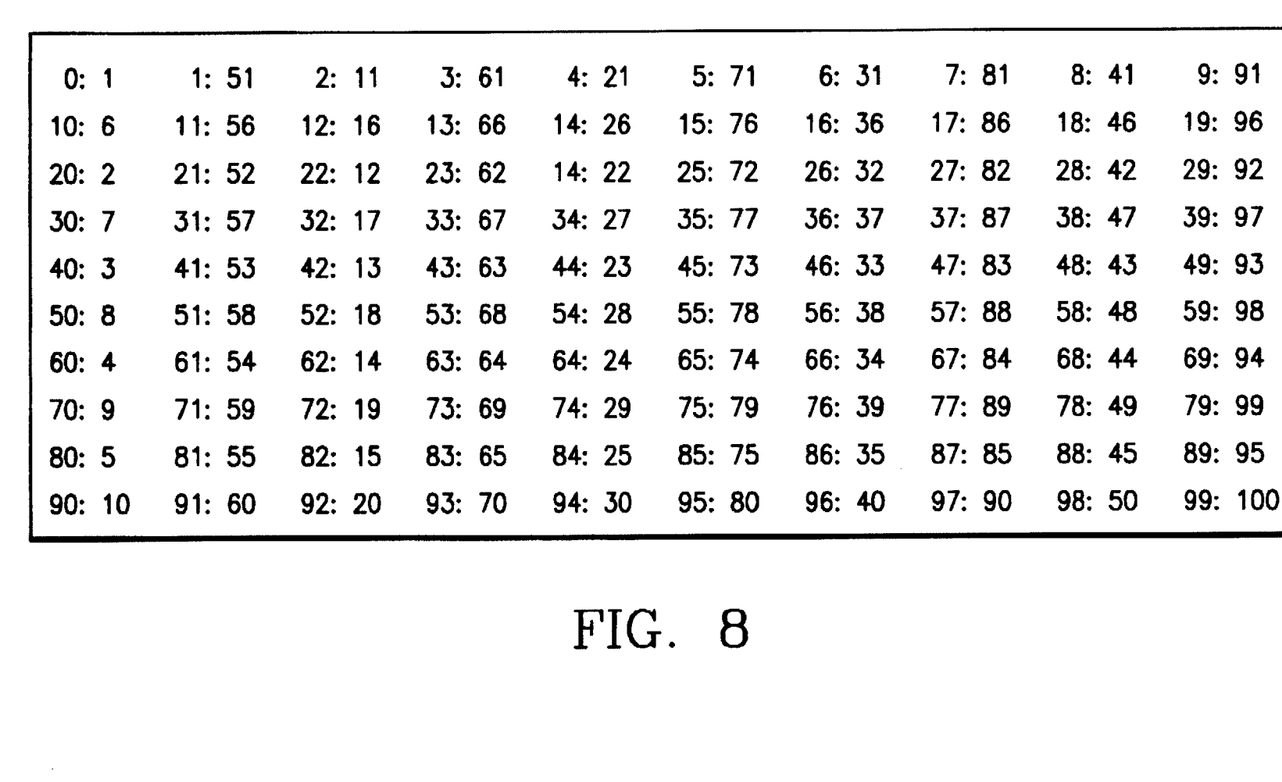
FIG. 8 is a call allocation table illustrating the various numbers for the array of the precise percent allocation (PPA) algorithm of the instant invention.

The first of the routing algorithms, namely precise percent allocation (PPA) noted above, is discussed in detail herein with reference to FIG. 8. In particular, percent allocation describes a call routing method in which calls in a sequence of call requests for the same set of terminations are distributed among the terminations in exactly the same proportions specified for each of the terminations in the requests. Its main use is for call requests having the same customer key and originating area ID, which are to be distributed among the terminations defined at a given node at the currently active routing plan of the subscriber (where the trigger point is located). For the aforenoted co-pending application, percent allocation may also be used to resolve equal availabilities among the terminations.

The PPA database 66 (FIG. 7) contains an entry, and therefore an index for every customer key/origination ID combination which appears in the routing requests. As new key combinations are encountered, records are added to the database. A utility runs at regular intervals to remove those records that have not been accessed recently, thereby preventing the database from becoming filled with unused entries.

Each of the records contains two PPA indexes, a main index which is used for normal percent allocation routing requests, and a tie index which is accessed when percent allocation is used to resolve ties of equal availability. (This second index will be further described in the aforenoted co-pending application). For the instant invention, main indexes are maintained in the range of 1–100, in actuality from 0–99.

In the first percent allocation method, to be referred to herein as the precise percent allocation (PPA) algorithm, the 100 numbers are generated and shown in the call allocation table of FIG. 8. The generation of the numbers of the FIG. 8 table will be described with reference to a particular equation, to be discussed, infra. As shown, the FIG. 8 table is an array of 100 elements each of which contains a number in the range of 1–100. The order of numbers in the table is chosen to produce an evenly spread distribution sequence over its range.

Figure 9:
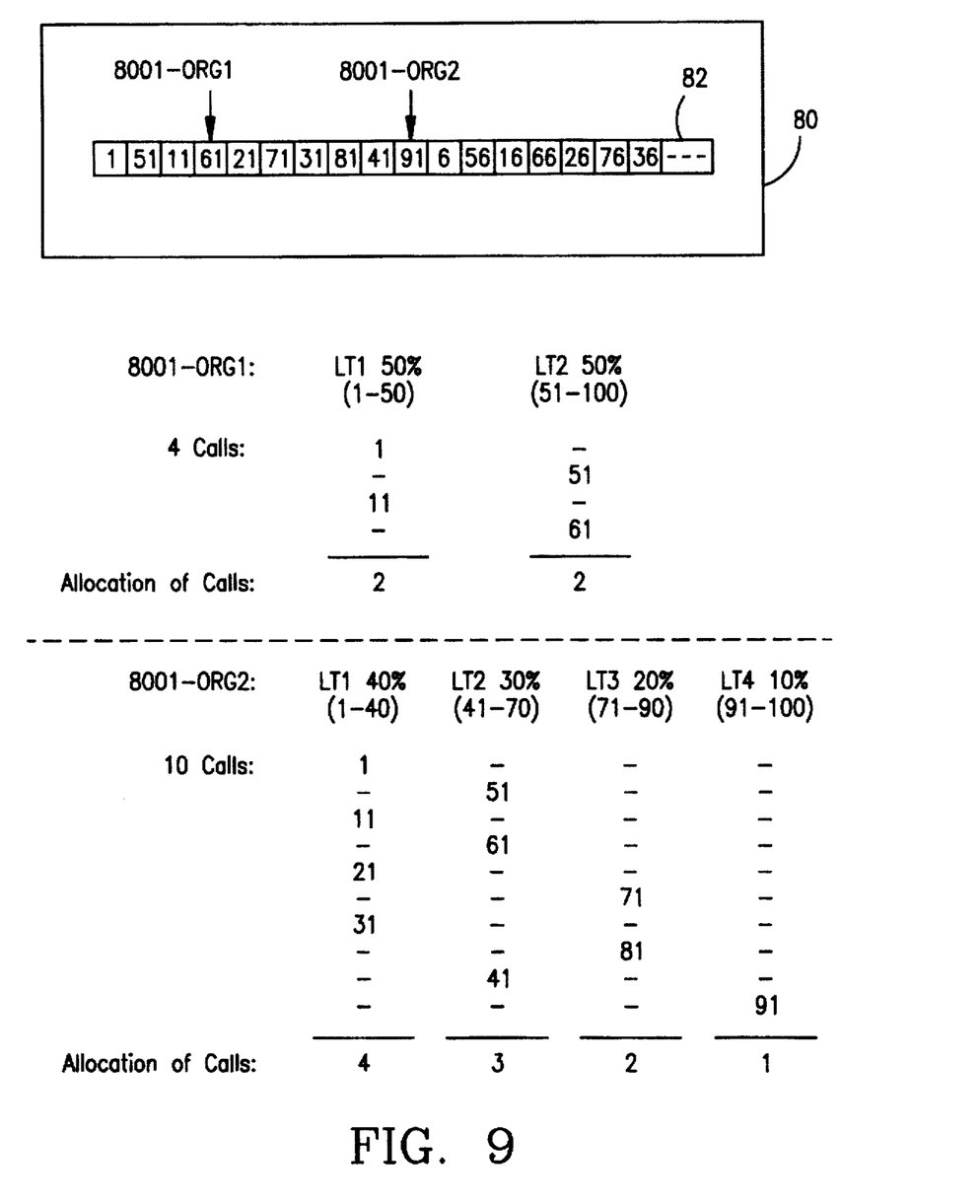
FIG. 9 is an illustration for enhancing the understanding of the precise percent allocation algorithm.

FIG. 9 is an illustration of an exemplar sequence of the array of FIG. 8 which enables the TADB 14 to route successive calls made to a special service call number, in the specified proportions, to the terminations identified by the subscriber in his routing plan.

As shown, array 82 is comprised of a number of elements each having a different number in the range of 1–100. Putting it differently, the numbers of array 82 are located at different positions, or locations along the array.

Further shown are two indexes, designated ORG 1 and ORG 2 each representing a special service call, for example a 800 number, subscribed by a customer. ORG may be assumed to be the origination area, or NPA, at which particular calls to that special service originate. For the discussion of FIG. 9, ORG 1 and ORG 2 may also be referred to as index 1 and index 2, respectively. Indexes 1 and 2 are movable along array 82 sequentially according to each call (or call request) received by TADB 14 for each of the call numbers represented thereby. For example, insofar as index 1 is pointing to number 61 of array 82, when the next call directed to the same 800 number is received in TADB 14, index 1 will be incremented by 1 along array 82 to the next position, represented by number 21. These numbers in array 82 in fact represent indirectly the terminations to which calls are to be routed. Putting it differently, at every call attempt, each candidate termination in the call request is assigned a number range, known as its allocation range, which is proportional to its specified percent allocation. The allocation range is assigned to candidate terminations in a single request start at 0 and are contiguous and non-overlapping. The appropriate PPA index, for example either index 1 or index 2, is then accessed from the database and used to index the call allocation table, for example array 82. The selected termination is the one in whose allocation range the number accessed from the table falls. Thus, because the candidate terminations are present in the same order in each request (so that they are allocated the same number range for each call), the terminations will be selected in exactly the same proportion as their specified percent allocation. The choice of the array sequence in FIG. 8 ensures that the proportionality is accurate over a small number of call attempts.

Putting it simply, assume for the FIG. 9 example that calls directed to the first 800 number (i.e., ORG 1) are to be routed to two identified terminations of the subscriber, namely LT1 and LT2. Further assume that each of the terminations LT1 and LT2 is to be assigned a 50% allocation so that in essence, each of the terminations LT1 and LT2 should receive the same number of calls for the specific 800 number. Accordingly, the numbers in the array are divided such that numbers 1–50 are assigned to termination LT1 while numbers 51–100 are assigned to termination LT2.

Now assume that four calls (or call requests) are received by TADB 14. Assuming that the first call started at the first position or element of array 82 (i.e., number 1), index 1 originally would be positioned at number 1. Since number 1 falls between the numbers 1–50, TADB 14 would inform the DAP that the first call is to be routed to termination LT1, which may be an ACD located in the east coast.

Upon receipt of the second call directed to the same 800 number, index 1 is incremented to number 51, the second element of array 82. Since number 51 is a value falling between 51 and 100, TADB 14 would inform the DAP to route the call to termination LT2, which may be an ACD located in the west coast.

For the third call directed to the same 800 number, index 1 is moved to number 11, which is between numbers 1–50. Accordingly, that call is routed to termination LT1. Similarly, upon receipt of the fourth call, index 1 is incrementally moved to the next position corresponding to the number 61. And since 61 falls between 51 and 100, that call is routed to termination LT2. Accordingly, for those four calls, two of the calls are routed to termination LT1 while the remaining two are routed to termination LT2. Do note that these proportions are accurate after every 2 calls.

A second example of the FIG. 9 array can be had with reference to the 800 number represented by index 2 of ORG 2. The subscriber of this particular 800 number has identified four terminations to which calls to that 800 number may be routed. The subscriber furthermore has assigned to each of those terminations a particular percentage, namely 40% for termination LT1, 30% for termination LT2, 20% for termination LT3 and 10% for termination LT4. Accordingly, the following division of numbers is provided for the different terminations: 1–40 for termination LT1, 41–70 for termination LT2, 71–90 for termination LT3 and 91–100 for termination LT4.

As shown in FIG. 9, each of the ten calls made to the second 800 number is compared against the allocation range assigned to the element to which index 2 designates the call along array 82. Thus, call 1, since it fell on number 1 which is between 1–40, was routed termination LT1. The second call, being designated 51 which is between 71–90, was routed to termination LT3. The remaining calls similarly were routed to the respective terminations LT1 to LT4 per shown. When all 10 calls are taken into consideration, as indicated by the respective locations pointed to by index 2 on array 82, it can be seen that 4 of the calls have been routed to termination LT1, 3 to termination LT2, 2 to termination LT3 and 1 to termination LT4. Such routing of the calls fit perfectly with the percentage set by the subscriber to the terminations and is accurate over only 10 calls.

In essence, therefore, the PPA method can be used for whatever the percentages are and however many terminations there are for each of the customers. The only thing that needs to be remembered in the PPA database is the location in the array so that the index may be incremented upon receipt of the next call. This has the effect of remembering where the last call was sent, so that the next call may be automatically sent to the next termination in accordance with the percent allocated by the subscriber. Putting it yet somewhat differently, the PPA method is a way of automatically routing calls without having the need to store substantial amounts of information on a per customer ORG basis, as the information is already contained in the array, and the index itself is stored on a per customer/ORG basis.

When the index representing the 800 number reaches the end of the array, upon receipt of the next call request, the index is automatically returned to the first element of the array so that the same set of numbers in the array are used over and over again, in sequence. The same array is used for all routing requests, only the per customer/ORG index changes.

Notwithstanding the above, special consideration should be taken when the total of the percent allocation for a set of candidate terminations is not 100%. This normally does not happen if the routing plans have been correctly entered and validated as occurs at NetCap. But in the event that the percent allocation for terminations do not add up to 100%, then the number sequence that is used to distribute the calls is reduced accordingly. For instance, if the sum of percent allocations, designated for example by N, is less than 100, the repetition cycle becomes N, instead of 100. The ratios of calls routed to candidate terminations would accordingly remain exactly as specified by the percent allocations. Do note that this feature is used in PLB/PALB routing for resolving equal availabilities and will be discussed in further detail in the aforenoted co-pending application.

In the event that N exceeds 100, then the allocations are scaled. But the repetition cycle remains at 100. Because scaling involves rounding, the ratios cannot exactly reflect the percent allocations. And because of the repetitive nature of the algorithm, the same terminations will receive the "odd" calls in cycles. Thus over time, it might appear to diverge somewhat from the specified percent allocations. However, NetCap disallows N greater than 100 in the routing plan.

Another abnormality that should be taken into consideration is a percent allocation of 0. This 0% allocation is valid for routing request. In brief, it has the effect of removing terminations from consideration under the PPA method, but still retain them as candidate terminations for other routing algorithms, including SAR. Under PPA, terminations having a percent allocation of 0% are assigned allocation ranges of 0 and consequently are disregarded. If all terminations in a routing request have a percent allocations of 0%, then obviously no selection has been made by the subscriber, and a use "default" response is returned by TADB 14 to the DAP so that all calls to that 800 number are routed according to the defaults stored at the DAP. Under SAR, percent allocations are ignored and routing is solely based on the order of terminations in the allocation array. Accordingly, even 0% terminations are eligible in the SAR method.

The numbers of the FIG. 8 array are obtained according to the following equation (1):

$$n_i = (i\% \ 2)*50 + (i/2\% \ 5)*10 + (i/10\% \ 2)*5 + (i/20\% \ 5) + 1$$

where:
- n represents a set of numbers in the range of 1–100
- i represents the array index (0–99)
- $n_i$ is the value of the $i^{th}$ array element
- / represents integer division, truncated towards 0
- % represents the remainder after division For example, element 40, when plugged into equation (1), yields the number 3. This results from obtaining a 0 from the first three terms and a 2 for the fourth term of equation (1). A more detailed discussion is as follows. For the first term [(i% 2)*50], 40 divided by 2 yields integer 20. Accordingly, there is no remainder and therefore the first term yields a 0. For the second term [(i/2% 5)*10], 40 when divided by 2 yields 20 and 20 divided by 5 yields 4 which also is an integer. Accordingly, term 2 also yields 0. For the third term [(i/10% 2)*5], 40 divided by 10 yields an integer 4, which in turn when divided by 2 yields an integer 2. Thus, Term 3 also yields 0. In term 4 [(i/20%5)], since 40 divided by 20 yields 2 and 2 is not divisible by 5 as an integer. Then 2 remains. Accordingly, when the result of term 4, namely 2 is added to 1, the number 3 is obtained for element 40 of the FIG. 8 table.

A second example may be had with respect to element 37. In term 1 of equation (1), since 37 divided by 2 yields 18.5. There is a remainder. And since 18 times 2 is 36 and the number of element 37 is 37, then a remainder of 1 results. This reminder when multiplied by 50 yields 50 for the first term. In the second term, 37 divided by 2 yields 18.5. Dividing only integer 18 by 5 yields a remainder of 3. This remainder 3 is multiplied with 10 to yield a result of 30. For the third term of equation (1), 37 divided by 10 yields 3.7. Taking only integer 3 into account and dividing that by 2 yields a remainder of 1. Multiplying 1 with 5 yields 5 for the third term. In the fourth term, 37 is divided by 20 to yield an integer of 1 which, when divided by 5, yields a remainder of 1. When all of the numbers of the various terms (50+30+5+1+1) are combined, 87 results. And 87 of course represents the percent allocation of element 37 of the array of FIG. 8.

Yet another example of using element 53 of the array would yield 50 for the first term, 10 for the second term, 5 for the third term and 2 for the fourth term. Adding those numbers together with the 1 of the last term of equation (1) yields 68.

The rest of the numbers of the array of FIG. 8 are obtained likewise.

A second method or algorithm that may be used with TADB 14 is the sequential allocation routing (SAR). SAR essentially mirrors PPA in that an index for a particular 800 number and ORG combination is also used. However, for SAR, no attention needs to be paid to the contents of the elements of the array. Rather, it is the index that is used to select the next termination from among those identified by the subscriber, so that sequential call requests to TADB 14 are routed to the respective terminations sequentially. For the PPA and SAR methods, these terminations may be considered to be ordered representations.

For example, consider the case where a subscriber has designated four terminations to which calls to a particular subscribed 800 number/ORG are to be routed. Using SAR, the index for this 800 number is directly interpreted as a termination in the allocation array.

Thus, for an array having only four elements for the exemplar SAR, the first element is labeled 0, the second 1, the third 2, and the fourth 3. Assume the index for the SAR is pointed to the beginning of the array, i.e., at element 0.

Thus, the first call is routed to termination 1, the second call to termination 2, the third call to termination 3 and the fourth call to termination 4. Subsequent calls are again sequentially provided to terminations 1, 2, 3 and 4 repeatedly. Of course, with the movable index, the termination to which the next call is to be routed is remembered. For the SAR method, the index may be thought of as a counter in which a sequential counting of the various elements of the array is kept.

In sum, when utilized by the TADB, the PPA and SAR algorithms provide accurate routing of calls to the different terminations of a subscriber.

Inasmuch as the present invention is subject to many variations, modifications, and changes in detail, it is intended that all matters described in this specification and shown in the accompanying drawings be interpreted as illustrative only and not in a limiting sense. Accordingly, it is intended that the invention be limited only the spirit and scope of the hereto appended claims.

We claim:

1. In a telecommunications network having originating and terminating switches for network routing of special service calls, a system for routing the special service calls among a plurality of terminations, comprising:

traffic data collect means for collecting data indicative of traffic through said network from said switches;

analysis means for receiving said traffic data from said traffic data collect means, said analysis means further receiving from subscribers of special service calls routing plans for routing calls to said terminations, each of said routing plans comprising at least one trigger point; and control means interconnected to receive at least one of said routing plans from said analysis means for a special service call number of a subscriber, wherein, in response to each incoming call directed to said special service call number, said control means being responsive to at least one trigger point in said one routing plan to select an algorithm to determine the most appropriate termination from among said plurality of terminations to route said each incoming call.

2. The system of claim 1, wherein said control means comprises:

at least one memory means for storing at least one algorithm for routing calls to respective ones of said terminations identified by said subscriber in said routing plan, said routing plan including the respective percentages of calls to be routed to said respective terminations assigned by said subscriber in said routing plan; and processor means for utilizing said one algorithm to route calls directed to said special service call number to respective ones of said terminations in accordance to said routing plan.

3. The system of claim 1, wherein said control means further comprises:

data base means for maintaining at least one list of numbers corresponding to respective ones of said terminations identified in said routing plan; and at least one counter for keeping track of the allocation of calls made to said special service call number and for correlating respective locations on said list with respective percentages assigned in said routing plan to corresponding ones of said terminations to identify the termination to which said each call for said special service call number is to be routed as the most available termination for said each call.

4. The system of claim 1, wherein said analysis means further obtains from said traffic data collect means information relating to the availability of said terminations and provides the termination availability information to said control means for updating the availability of said terminations.

5. The system of claim 1, further comprising:
a backup control means on standby to said control means so that said backup control means takes over if said control means fails.

6. A system of balancing traffic of special service calls among a plurality of automatic call distributors (ACDs), said ACDs being connected to receive said special service calls via a telecommunications network having switches for network routing of calls, comprising:
traffic data collect means for collecting data indicative of traffic through said network from said switches;
analysis means for receiving said traffic data, said analysis means further receiving from each subscriber of special service calls at least one routing plan for a subscribed special service call number in which said each subscriber identifies the ACDs and the respective percentages of calls made to said subscribed special service call number which are to be routed to each of said ACDs, said at least one routing plan comprising at least one trigger point; and
control means interconnected to receive said at least one routing plan from said analysis means and responsive to at least one trigger point in said at least one routing plan to select an algorithm to determine the most appropriate ACD from among said ACDs to route each incoming call of said special service call number.

7. The system of claim 6, wherein said control means comprises:
at least one memory means for storing at least one algorithm for routing calls to respective ones of said ACDs identified by said subscriber in said routing plan; and
processor means for utilizing said one algorithm to route calls of said special service call number to respective ones of said ACDs in accordance to said routing plan.

8. The system of claim 6, wherein said control means comprises;
data base means for maintaining at least one list of numbers corresponding to respective ones of said ACDs identified in said routing plan; and
at least one counter for keeping track of the allocation of calls made to said special service call number and for correlating respective locations on said at least one list with respective percentages assigned in said routing plan to corresponding ones of said ACDs to identify the ACD to which each call directed to said special service call number is to be routed as the most available ACD for said each call.

9. The system of claim 6, wherein said analysis means further obtains from said traffic data information relating to the availability of said ACDs and provides the termination availability information to said control means for updating the availability of said ACDs.

10. The system of claim 6, further comprising:
a backup control means on standby to said control means so that said backup control means takes over if said control means fails.

11. In a telecommunications network having switches for network routing of special service calls, a method of routing the special service calls among a plurality of terminations, comprising the steps of:

collecting data indicative of traffic through said network from said switches;
analyzing the collected traffic data and special service call routing plans from subscribers for routing calls to said terminations, each of said routing plans comprising at least one trigger point; and
routing calls for a special service call number of a subscriber based on a routing plan of said subscriber by locating in response to at least one trigger point in said routing plan an algorithm to determine the most appropriate termination from among said terminations to route each incoming call of said special service call number.

12. The method of claim 11, wherein said routing step further comprises the steps of:
storing in at least one memory means at least one algorithm for routing calls to respective ones of said terminations identified by said subscriber in said routing plan, said routing plan including the respective percentages of calls to be routed to said respective terminations assigned by said subscriber in said routing plan; and
utilizing said at least one algorithm to route calls of said special service call number to respective ones of said terminations in accordance to said routing plan.

13. The method of claim 11, wherein said routing step further comprises the steps of:
maintaining in a data base means at least one list of numbers corresponding to respective ones of said terminations identified in said routing plan;
keeping track of the allocation of calls made to said special service call in at least one counter; and
correlating respective locations on said at least one list with respective percentages assigned in said routing plan to corresponding ones of said terminations to identify the termination to which said each call for said special service call number is to be routed as the most appropriate termination for said each call.

14. The method of claim 11, wherein said collecting step further comprises the step of:
retrieving information from the collected traffic data relating to the availability of termination; and
wherein said analyzing step further comprises the step of:
updating the availability of said terminations by utilizing said traffic data information relating to the availability of said terminations.

15. A method of balancing traffic of special service calls among a plurality of automatic call distributors (ACDs), said ACDs being connected to receive said special service calls via a telecommunications network having switches for network routing of calls, comprising the steps of:
collecting data indicative of traffic through said network from said switches;
analyzing the collected traffic data;
receiving from each subscriber of special service calls at least one routing plan for a subscribed special service call number in which said subscriber identifies the ACDs and the respective percentages of calls made to said subscribed special service call number which are to be routed to each of said ACDs, said at least one routing plan comprising at least one trigger point; and
routing calls based on said routing plan by locating in response to at least one trigger point in said routing plan an algorithm to determine the most appropriate ACD from among said ACDs to route each incoming call of said subscribed special service call number.

16. The method of claim 15, wherein said routing step further comprises the steps of:

storing in at least one memory means at least one algorithm for routing calls to respective ones of said ACDs identified by said subscriber in said routing plan; and utilizing said one algorithm to route calls of said subscribed special service call number to respective ones of said ACDs in accordance to said routing plan.

17. The method of claim 15 wherein said routing step further comprises the steps of;

maintaining in a data base means at least one list of numbers corresponding to respective ones of said ACDs identified in said routing plan;

keeping track of the allocation of calls made to said subscribed special service call in at least one counter; and correlating respective locations on said at least one list with respective percentages assigned in said routing plan to corresponding ones of said ACDs to identify the ACD to which said each call for said subscribed special service call number is to be routed as the most available ACD for said each call.

18. The method of claim 15, wherein said analyzing step further comprises the step of:

analyzing from said traffic data information relating to the availability of said ACDs;

the method further comprising the step of:

updating the availability of said ACDs using the ACD availability information.

* * * * *